(12) United States Patent
McGee et al.

(10) Patent No.: US 7,559,479 B2
(45) Date of Patent: Jul. 14, 2009

(54) FINANCIAL PRESENTATION INSTRUMENTS WITH INTEGRATED HOLDER AND METHODS FOR USE

(75) Inventors: Christopher McGee, Parker, CO (US); Keith Newbrough, Parker, CO (US); Kenneth Algiene, Littleton, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/849,766

(22) Filed: Sep. 4, 2007

(65) Prior Publication Data

US 2007/0295821 A1     Dec. 27, 2007

Related U.S. Application Data

(63) Continuation of application No. 10/665,984, filed on Sep. 19, 2003, now Pat. No. 7,278,570.

(51) Int. Cl.
*G06K 7/00* (2006.01)
(52) U.S. Cl. .................. 235/486; 235/380; 235/487; 235/493
(58) Field of Classification Search ............ 235/380, 235/486, 487, 493; D19/1, 2, 9, 10, 12; D20/21, 22, 27, 40, 42; 40/1.5, 124.01, 124.04, 40/260
See application file for complete search history.

(56) References Cited

U.S. PATENT DOCUMENTS

| 4,804,827 | A | 2/1989 | Jung |
|---|---|---|---|
| 4,829,168 | A | 5/1989 | Nakahara |
| 5,609,253 | A | 3/1997 | Goade, Sr. |
| 5,720,158 | A | 2/1998 | Goade, Sr. |
| D396,882 | S | 8/1998 | Neal, Jr. |
| 5,863,076 | A | 1/1999 | Warther |
| 5,918,909 | A | 7/1999 | Fiala et al. |
| 5,921,584 | A | 7/1999 | Goade, Sr. |
| D429,733 | S | 8/2000 | Jones et al. |
| 6,145,665 | A | 11/2000 | Krahn |
| D436,991 | S | 1/2001 | Morgante |

(Continued)

FOREIGN PATENT DOCUMENTS

CA     2300241     3/2000

(Continued)

*Primary Examiner*—Michael G Lee
*Assistant Examiner*—Kristy A Haupt
(74) *Attorney, Agent, or Firm*—Townsend, Townsend & Crew LLP (57) ABSTRACT

The present invention provides improved apparatus, methods, and systems for displaying and packaging financial presentation instruments, particularly stored value, gift, or other pre-paid debit cards. In one embodiment of the present invention, a method for displaying a financial presentation instrument with an integrated holder is provided. The method comprises providing a data card having an information storage medium and an aperture therethrough. The data card is then suspended from a display hook through the at least one aperture. Hence, the present invention advantageously allows for convenient displaying and easy access to the data card for activation at the time the card is purchased by a consumer. Further, the integrated holder on the data card decreases the operating costs and increases the efficiency for selling such debit cards as no additional materials, packaging, or carriers other than the data card itself are needed for the presentation and display of such debit cards.

12 Claims, 10 Drawing Sheets

U.S. PATENT DOCUMENTS

| | | | |
|---|---|---|---|
| 6,196,594 | B1 | 3/2001 | Keller |
| D457,556 | S | 5/2002 | Hochschild |
| 6,471,127 | B2 | 10/2002 | Pentz et al. |
| 6,484,940 | B1 | 11/2002 | Dilday et al. |
| 6,543,809 | B1 | 4/2003 | Kistner et al. |
| 6,588,658 | B1 | 7/2003 | Blank |
| 6,708,820 | B2 | 3/2004 | Hansen et al. |
| 6,760,280 | B1 | 7/2004 | Schoppe |
| 6,814,286 | B2 | 11/2004 | Cheung |
| D512,456 | S | 12/2005 | Diaz et al. |
| 7,000,844 | B1 * | 2/2006 | Smith .................. 235/487 |
| 7,032,817 | B2 | 4/2006 | Blank |
| 7,213,764 | B2 * | 5/2007 | Lasch et al. ............ 235/486 |
| 7,278,570 | B2 * | 10/2007 | McGee et al. .......... 235/380 |
| 2002/0006103 | A1 | 1/2002 | Duroj |
| 2002/0027837 | A1 | 3/2002 | Weber |
| 2002/0053595 | A1 | 5/2002 | Tseng et al. |
| 2002/0066789 | A1 | 6/2002 | Yen |
| 2002/0157974 | A1 | 10/2002 | Krahn |
| 2002/0185543 | A1 | 12/2002 | Pentz et al. |
| 2003/0010829 | A1 | 1/2003 | Krygier |
| 2003/0086705 | A1 | 5/2003 | Silverbrook et al. |
| 2003/0233844 | A1 | 12/2003 | Rheinstein |
| 2004/0040189 | A1 | 3/2004 | Chandaria |
| 2004/0080784 | A1 | 4/2004 | Fujimoto |
| 2004/0182940 | A1 | 9/2004 | Biller |

FOREIGN PATENT DOCUMENTS

JP    2001109859 A    4/2001

* cited by examiner

FINANCIAL PRESENTATION INSTRUMENTS WITH INTEGRATED HOLDER AND METHODS FOR USE

This application is a continuation of U.S. patent application Ser. No. 10/665,984, filed Sep. 19, 2003, entitled "FINANCIAL PRESENTATION INSTRUMENTS WITH INTEGRATED HOLDER AND METHODS FOR USE", which is hereby incorporated by reference in its entirety for all purposes.

BACKGROUND OF THE INVENTION

1. Field of the Invention

The present invention generally relates to financial presentation instruments. More particularly, the present invention relates to financial presentation instruments with an integrated holder as well as methods and systems for displaying and packaging such instruments, preferably stored value, gift, or other pre-paid debit cards.

Stored value, gift, or other pre-paid metered accounts associated with debits cards are well-known for providing access to goods and services. For example, stored value or gift cards may be purchased from various merchants such as Target®, Wal-Mart®, Starbucks®, Sears®, Blockbuster®, and the like. Pre-paid debit cards are also frequently purchased for telephone services. The purchase and usage of pre-paid debit cards has continued to increase in recent years to the point that the sale of pre-paid debit cards today is a multi-billion dollar industry.

Pre-paid debit cards are often printed and issued with a predetermined balance and typically then sold as a retail item. An example of such a card is a pre-paid gift card which provides an individual with a set dollar amount for the purchase of goods from a particular merchant. The account is accessed and debited by using an account number provided on the gift card. A problem experienced in the sale of such pre-paid debit cards is that merchants buying these cards are subsequently more exposed to loss through shrinkage and theft. As such, the merchant typically stores such pre-paid debit cards under lock and key until the moment the cards are purchased. This in turn prevents stocking of such cards on store shelves freely accessible by prospective purchasers and increases merchant handling time and expenses. In addition, the merchant must maintain inventory stock of different values of these pre-paid debit cards well in advance of when the debit cards are actually sold as a retail item, thus restricting working capitol.

With these problems in mind, merchants have begun to display non-activated (i.e., zero balance) debit cards. In this way, the merchant can readily provide unfettered access of such cards to prospective purchasers and reduce handling time and costs as theft is no longer a concern since the non-activated debit cards have no intrinsic value. Further, merchants no longer carry a large initial expenditure since the merchant activates the debit card with a balance representing an amount a consumer wishes to attribute to the debit card at the time the debit card is actually purchased by the consumer.

Typically, such zero balance debit cards are displayed and/or packaged for sale in a retail store by affixing the card to a card carrier. The card is typically affixed to the card carrier by adhesives or by inserting corners of the card into openings within the card carrier. Further, a hole may optionally be cut into the card carrier so that the card carrier may be hung on a display in a retail store. Such card packaging is often cumbersome in that the merchant has to first remove the card from the packaging in which the card is displayed in order to activate the card at the time the debit card is actually sold. Further, the card packaging increases the operating costs and reduces the efficiency for selling such debit cards and does not always provide for secure retention of the debit card.

For these and other reasons, there is a need in the art to provide improved apparatus, methods, and systems for displaying and packaging financial presentation instruments, particularly stored value, gift, or other pre-paid debit cards. In light of the fact that the consumer must have the card activated at the time the card is purchased, it is desirable to provide improved apparatus and methods in which the merchant is able to activate the card without having to first remove the card from packaging in which the card is displayed. It is further desirable to reduce the operating costs and increase the efficiency for displaying such zero balance debit cards. It is still further desirable to provide improved systems and methods for securely packaging the pre-paid debit card after it has been activated. These and other shortcomings in the prior art are addressed by the present invention.

2. Description of the Background Art

Card display packaging is described in U.S. Pat. Nos. 5,720,158, 5,918,909, 5,921,584, and 6,543,809. Credit card like structures are described in U.S. Pat. Nos. 4,829,168, 6,471,127, 6,588,658, D-396,882, D-429,733, D-436,991, and D-457,556; U.S. Patent Publication Nos. 2002/0027837, 2002/0185543, and 2003/0010828; and Canadian Patent No. 2,300,241.

The full disclosures of the each of the above references are incorporated herein by reference.

BRIEF SUMMARY OF THE INVENTION

Embodiments of the present invention provide improved apparatus, methods, and systems for displaying and packaging financial presentation instruments, particularly stored value, gift, or other pre-paid debit cards. In one embodiment of the present invention, a method for displaying a financial presentation instrument with an integrated holder is provided. The method comprises providing a data card having an information storage medium and an aperture therethrough. The storage medium is adapted to store a unique identifier. A display hook is also provided. The data card is then suspended from the display hook through the at least one aperture. Hence, the present invention advantageously allows for convenient displaying and easy access to the data card for activation at the time the card is purchased by a consumer. In particular, the integrated holder on the data card itself allows the merchant to simply activate the card after it has been displayed rather than having to first remove the card from conventional packaging. Further, the integrated holder on the data card decreases the operating costs and increases the efficiency for selling such debit cards as no additional materials, packaging, or carriers other than the data card itself are needed for the presentation and display of such debit cards.

As discussed above, the data card will generally comprise a stored value, gift, or other pre-paid debit card. However, it will be appreciated that the present invention may include conventional debit cards and credit cards, e.g., ATM cards, bank cards, VISA®, Mastercard®, American Express®, etc. The data cards may be activated to any desired amount a consumer wishes to attribute to the debit card. For example, the data cards may be activated to a denomination of $5, $10, $15, $20, $50, $100, or any other desired denomination. The information storage medium will generally comprises a magnetic stripe or bar code that is adapted to store a unique identifier so that the debit account may be properly accessed, activated, and/or debited. The information storage medium could also comprise radio frequency identification, computer chips, or other magnetic, radio frequency, or electronic storage media that may be readable by existing card reader technology, such as conventional point of sale ("POS") terminals.

The data card may comprise a large variety of shapes and sizes. Typically, the data card has a rectangular shape having standard credit card dimensions of approximately 2 1/8 inches high, 3 3/8 inches long, 1/8 of an inch corner radius, and 0.75 mm thick. The data card may alternatively have a circular shape similar to a compact disc or a DVD. Still further, the data card may comprise any desired shape or size that is capable of providing a magnetic stripe and an aperture therethrough. Likewise, the aperture may comprise a large variety of shapes and sizes as well as any number of holes depending on how the data card is to be displayed and/or packaged. For example, the aperture may comprise a circular, J-peg, semi-circular, oval, rectangle, square, or polygonal shape. The data card may further comprise an additional aperture therethrough for 2, 3, 4, etc. holes. In such an instance, it may be desirable to further provide an additional display hook(s) to suspend the data card from the additional aperture(s). The data card aperture will generally be located on a top portion, side portion, and/or central portion of the data card.

In one embodiment of the present invention, the financial presentation instrument with an integrated holder comprises a data card having an information storage medium that is adapted to store a unique identifier. The card further has at least a pair of apertures therethrough for suspending the data card from a display hook.

In another embodiment of the present invention, the financial presentation instrument with an integrated holder comprises a data card having an information storage medium that is adapted to store a unique identifier. The card further has at least one J-peg shaped aperture therethrough for suspending the data card from a display hook.

In yet another embodiment of the present invention, the financial presentation instrument with an integrated holder comprises a rectangular shaped data card having an information storage medium that is adapted to store a unique identifier. The card further has at least one aperture therethrough for suspending the data card from a display hook. The at least one aperture is located on a central portion of the data card.

In still another embodiment of the present invention, the financial presentation instrument with an integrated holder comprises a circular shaped data card having an information storage medium that is adapted to store a unique identifier. The card further has at least one centrally spaced aperture therethrough for suspending the data card from a display hook. The circular shaped data card has only one flat bottom edge. The information storage medium is located on the flat bottom edge of the data card.

In an alternative embodiment of the present invention, the financial presentation instrument with an integrated holder comprises a data card having an information storage medium that is adapted to store a unique identifier. The card further has at least one rectangular shaped aperture therethrough for suspending the data card from a display hook.

A system for packaging the financial presentation instrument with an integrated holder in a card carrier is also provided. The system comprises a data card having an information storage medium that is adapted to store a unique identifier and at least one aperture therethrough. A card carrier having at least one post thereon is also included. The at least one aperture is insertable onto that at least one post so that the data card is securely retained and completely encased by the card carrier. The card carrier may comprise a conventional compact disc or DVD holder. Alternatively, the card carrier may simply comprise a folded paper card or box. The at least one post will preferably comprise a centrally spaced raised button such as those found in standard compact disc or DVD cases. In such an instance, the post diameter will be approximately 5/8 of an inch. The aperture correspondingly comprises a centrally spaced circular shape that has a diameter of approximately 5/8 of an inch. However, it will be appreciated that the post may comprise any desired shape or size capable of receiving the at least one aperture. For instance, the at least one post may comprise a circular, J-peg, semi-circular, oval, rectangle, or polygonal raised shape.

A method for delivering a financial presentation instrument with an integrated holder is further provided. The method comprises providing a data card having an information storage medium that is adapted to store a unique identifier and at least one aperture therethrough. A card carrier having at least post thereon is further provided. The at least one aperture is inserted onto the at least one post so that the data card is securely retained and completely encased by the card carrier. Such packaging is generally implemented subsequent to data card activation.

These and other embodiments of the present invention are described in more detail in conjunction with the text below and attached figures.

BRIEF DESCRIPTION OF THE DRAWINGS

A further understanding of the nature and advantages of the present invention may be realized by reference to the detailed description and claims when considered in connection with the drawings, wherein like reference numerals are used throughout the several drawings to refer to similar components. The drawings, which are not necessarily to scale, illustratively depict embodiments of the present invention and are not intended to limit the scope of the invention.

DETAILED DESCRIPTION OF THE INVENTION

The present invention generally provides improved financial presentation instruments with an integrated holder as well as methods and systems for displaying and packaging such instruments, preferably stored value, gift, or other pre-paid debit cards. In light of the fact that a consumer must have the card activated at the time the card is purchased, the present invention provides improved apparatus and methods in which an issuing merchant is able to easily activate the card after it has been displayed without having to first remove the card from conventional packaging. The improved apparatus and methods of the present invention further reduce operating costs and increase the efficiency for displaying such zero balance debit cards. The present invention further provides improved systems and methods for securely packaging the pre-paid debit card after activation.

Figure 1A:
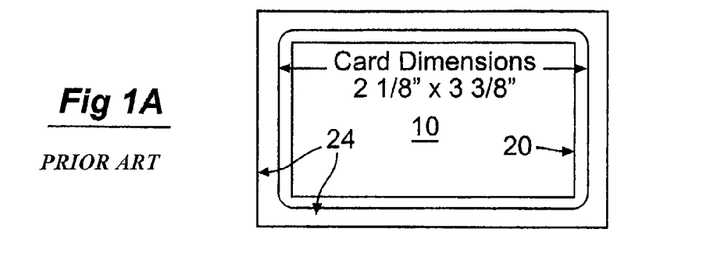
FIGS. 1A and 1B illustrate front and back views of a conventional data card.
Figure 1B:
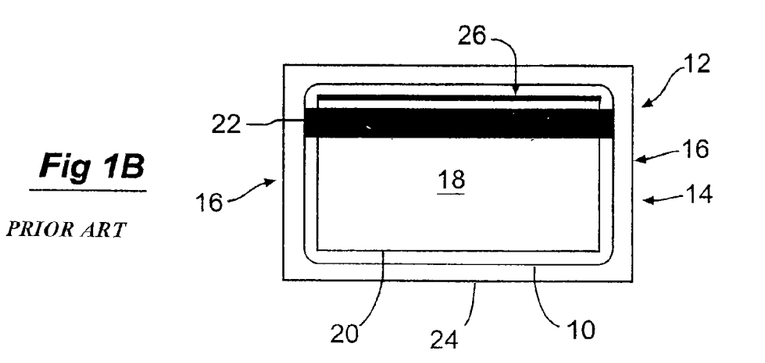

Referring now to FIGS. 1A and 1B, front and back views of a conventional credit or debit card 10 having a top portion 12, a bottom portion 14, side portions 16, and a central portion 18 are illustrated. FIG. 1A shows that the card 10 will generally have a rectangular shape and a standard credit card size of approximately 3 3/8 inches long by 2 1/8 inches high, a corner radius of 1/8 of an inch, and a thickness of approximately 0.75 mm according to CR80 standards. The card 10 will be formed from conventional materials including plastics, polymers, paper, and the like. The live copy limit 20 should fall at least 3/32 of an inch within the standard credit card dimensions. Live copy may include printed information on the front or back side of the card 10. For example, it may contain the name of the merchant issuing the gift card, such as Target®, Wal-Mart®, Starbucks®, Sears®, Blockbuster® or the value of the gift card, such as $5, $10, $15, $20, $50, $100, etc. Other information may be included on the card 10, such as instructional information, promotional information, website address, sponsor logos, graphics, or a signature block. Keeping all live copy within this area ensures against cropping of any live copy or graphics.

Referring to FIG. 1B, the back side of the card 10 contains a magnetic stripe 22 which runs parallel to the cards largest dimension and is approximately 3/16 of an inch from the top edge of the card 10. As shown, card bleeds 24 should extend at least 1/16 of an inch beyond the standard credit card dimensions. Magnetic stripe 22 stores information, such as a card number, that can be read by conventional point of sale terminals. All live copy should be kept at a distance 26 of at least 1/16 of an inch away from the magnetic stripe 22. It will be appreciated that in addition to or in lieu of the magnetic stripe 22, the card may contain a bar code, radio frequency identification, computer chips, or other magnetic, radio frequency, or electronic storage media that is adapted to store a unique identifier so that the debit account may be properly accessed, activated, and/or debited by existing card reader technology. Moreover, the data card 10 may comprise a variety of shapes and sizes depending on how the data card 10 is to be displayed and/or packaged and as such is not limited to conventional standard size credit cards as will be described in more detail below.

Figures 2A, 2B, 2C:
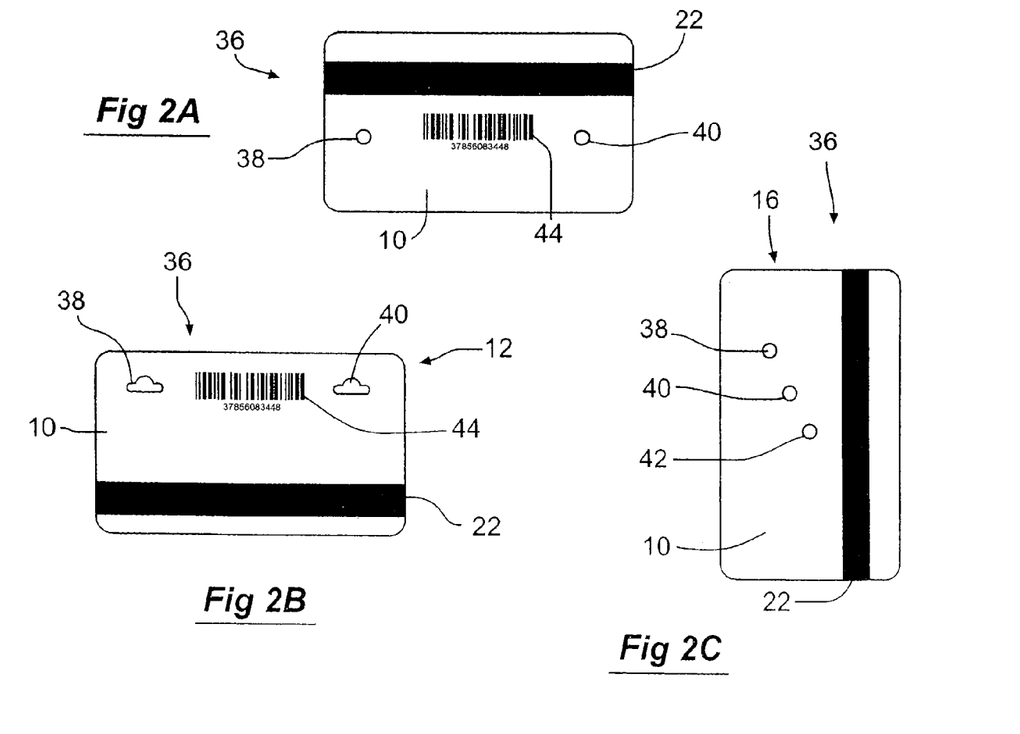
FIGS. 2A through 2G illustrate back views of financial presentation instruments in accordance with one embodiment of the present invention.

FIGS. 2A through 2C illustrate back views of financial presentation instruments 36 with integrated holders in accordance with one embodiment of the present invention. The financial presentation instrument 36 comprises a data card 10 having an information storage medium that is adapted to store a unique identifier, in this case a magnetic stripe 22. Further, a pair of apertures 38, 40 through the data card 10 are provided for suspending the data card 10 from a display hook. As shown in FIG. 2A, the pair of apertures 38, 40 comprise circular holes equally spaced from side portions 16 of the card 10. In FIG. 2B, the pair of apertures 38, 40 comprise J-peg holes equally spaced from the top portion 12 of the card 10. In FIG. 2C, an additional circular aperture 42 is provided through the card 10, wherein the apertures 38, 40, and 42 are equally spaced apart from one another to allow for display suspension flexibility. Further, the data cards may contain a bar code 44 in addition to the magnetic stripe 22, as seen in FIGS. 2A and 2B. The apertures 38, 40, 42 and bar code 44 should be within the copy limit 20 as well as 1/16 of an inch away from each other, the magnetic stripe 22 and/or any live copy. Advantageously, the integrated holder 38, 40, or 42 on the data card 10 itself allows for convenient displaying and easy access to the data card 10 for activation at the time the card is sold. Further, the integrated holder 38, 40, or 42 reduces expenses and handling time as no supplemental materials are needed other than the instrument 36 itself for presentation and display purposes. It will be appreciated that the above depictions are for illustrative purposes only and do not necessarily reflect the actual shape, size, or dimensions of the financial presentation instrument 36. This applies to all depictions herein.

Figure 2D:
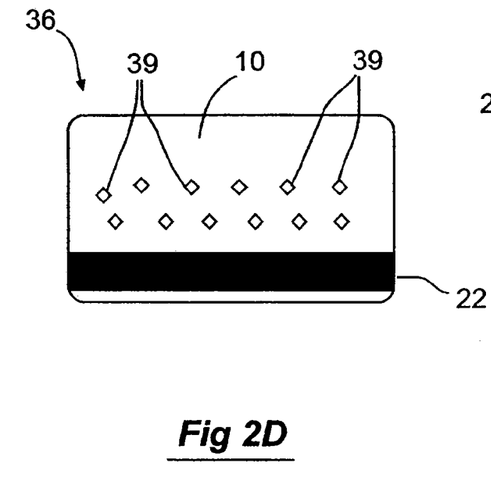
Figure 2E:
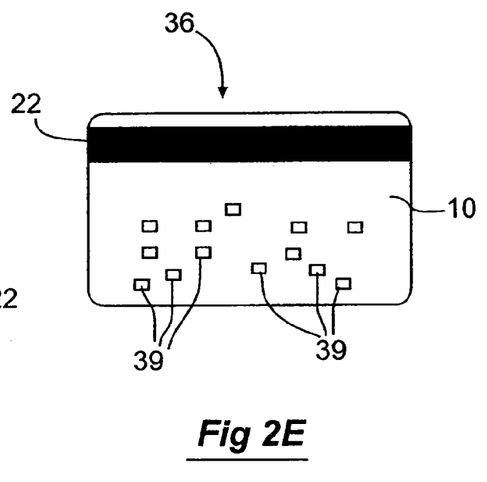
Figure 2F:
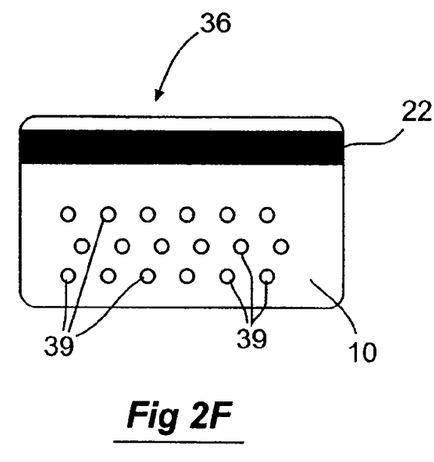
Figure 2G:
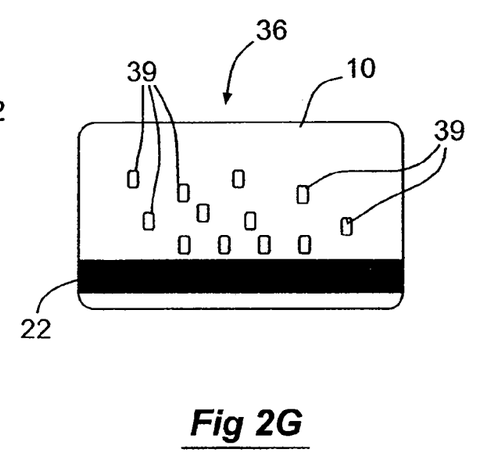

As shown in FIGS. 2D through 2G, the data card 10 may incorporate a plurality of apertures 39. In FIG. 2D, the plurality of apertures 39 may comprise diamond shaped holes. In FIG. 2E, the plurality of apertures 39 comprise square shaped holes. In FIGS. 2F and 2G, the data card has circular and oval shaped apertures 39, respectively. The plurality of apertures 39 may be arranged in any desired style, design, or orientation.

Figure 3A:
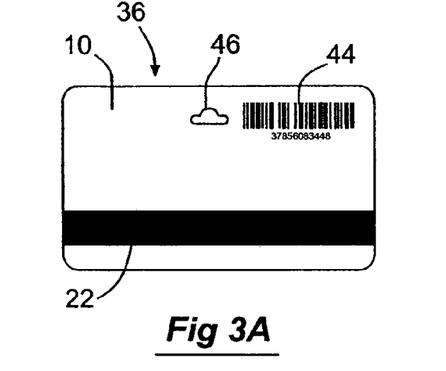
FIGS. 3A through 3C illustrate back views of financial presentation instruments in accordance with another embodiment of the present invention.
Figure 3B:
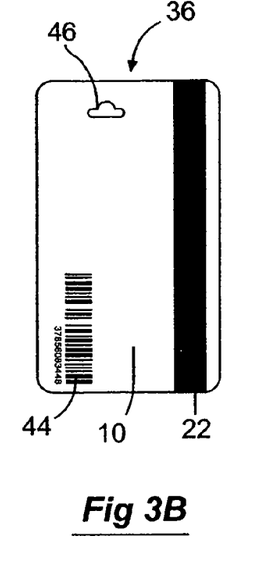
Figure 3C:
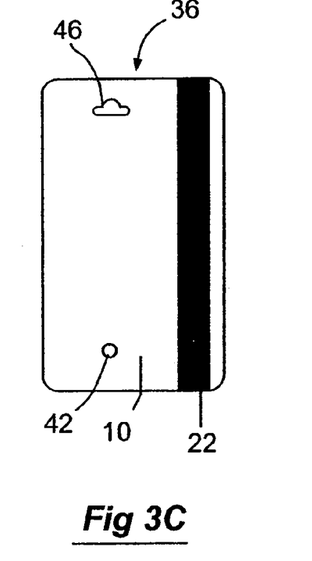

Referring now to FIGS. 3A through 3C, back views of financial presentation instruments 36 with integrated holder in accordance with another embodiment of the present invention are illustrated. The financial presentation instrument 36 comprises a data card 10 having an information storage medium that is adapted to store a unique identifier, in this case a magnetic stripe 22 and bar code 44. Further, a J-peg or "sombrero" shaped aperture 46 through the data card 10 is provided for suspending the data card 10 from a display hook. In FIG. 3A, the integrated holder comprises a single J-peg aperture 46 located on a top portion 12 of the card 10. In FIG. 3B, the integrated holder comprises a single J-peg aperture 46 located on a side portion of the 16 of the card 10. In FIG. 3C, the integrated holder comprises a J-peg aperture 46 on one side portion 16 of the card 10 and an additional circular aperture 42 on the other side portion 16 of the card 10.

Figure 4A:
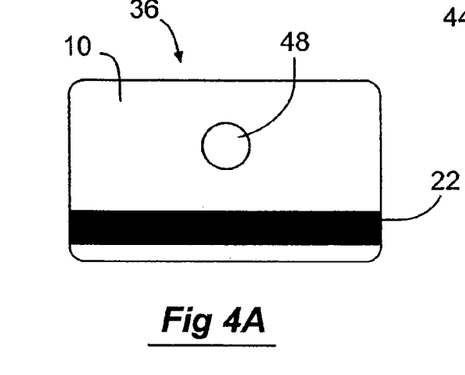
FIGS. 4A and 4B illustrate back views of financial presentation instruments in accordance with still another embodiment of the present invention.
Figure 4B:
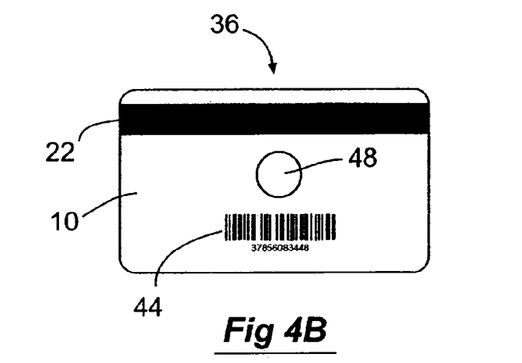

FIGS. 4A and 4B illustrate back views of financial presentation instruments 36 with integrated holder in accordance with still another embodiment of the present invention. The financial presentation instrument 36 comprises a rectangular shaped data card 10 having an information storage medium that is adapted to store a unique identifier, in this case a magnetic stripe 22. At least one centrally spaced aperture 48 through the data card 10 is provided for suspending the data card 10 from a display hook. In FIG. 4A, the magnetic stripe 22 is located on a bottom portion 14 of the card 10. In FIG. 4B, the centrally spaced aperture 48 comprises a circular hole located between the magnetic stripe 22 and bar code 44.

Figure 5:
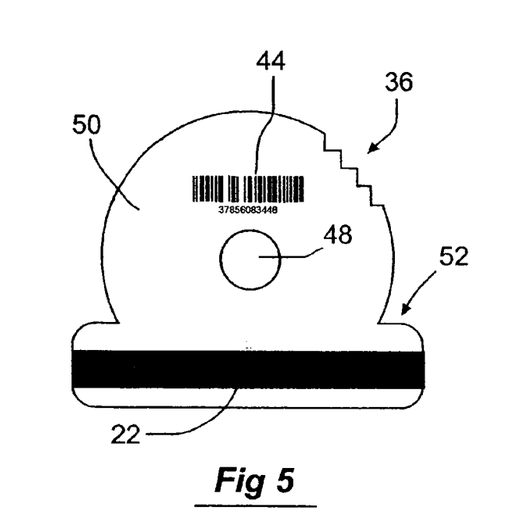
FIG. 5 illustrates a back view of a financial presentation instrument in accordance with yet another embodiment of the present invention.
Figure 6:
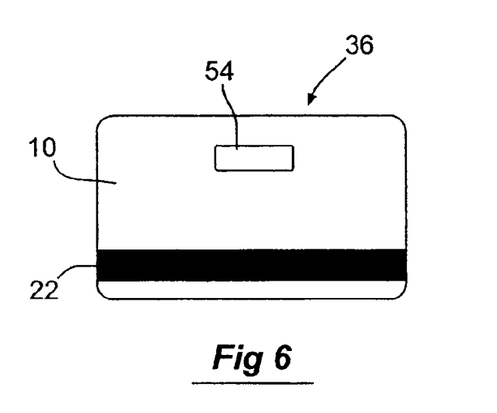
FIG. 6 illustrates a back view of a financial presentation instrument in accordance with alternative embodiment of the present invention.

Referring now to FIGS. 5 and 6, back views of financial presentation instruments 36 with integrated holder in accordance with yet other embodiments of the present invention are illustrated. In FIG. 5, the financial presentation instrument 36 comprises a circular shaped data card 50, similar to a compact disc, DVD, or doughnut shape, having an information storage medium that is adapted to store a unique identifier, in this case a magnetic stripe 22 and a bar code 44. At least one centrally spaced aperture 48 through the data card 50 is provided for suspending the data card 50 from a display hook. In particular, the circular shaped data card 50 has only one flat bottom edge 52 so as to accommodate readability of a standard magnetic stripe 22 that is located thereon. FIG. 6 illustrates a financial presentation instrument 36 comprising a data card 10 having an information storage medium comprising a magnetic stripe 22 and a rectangular shaped aperture 54 through the top portion 12 of the data card 10 for suspending the data card 10 from a display hook.

Figure 7A:
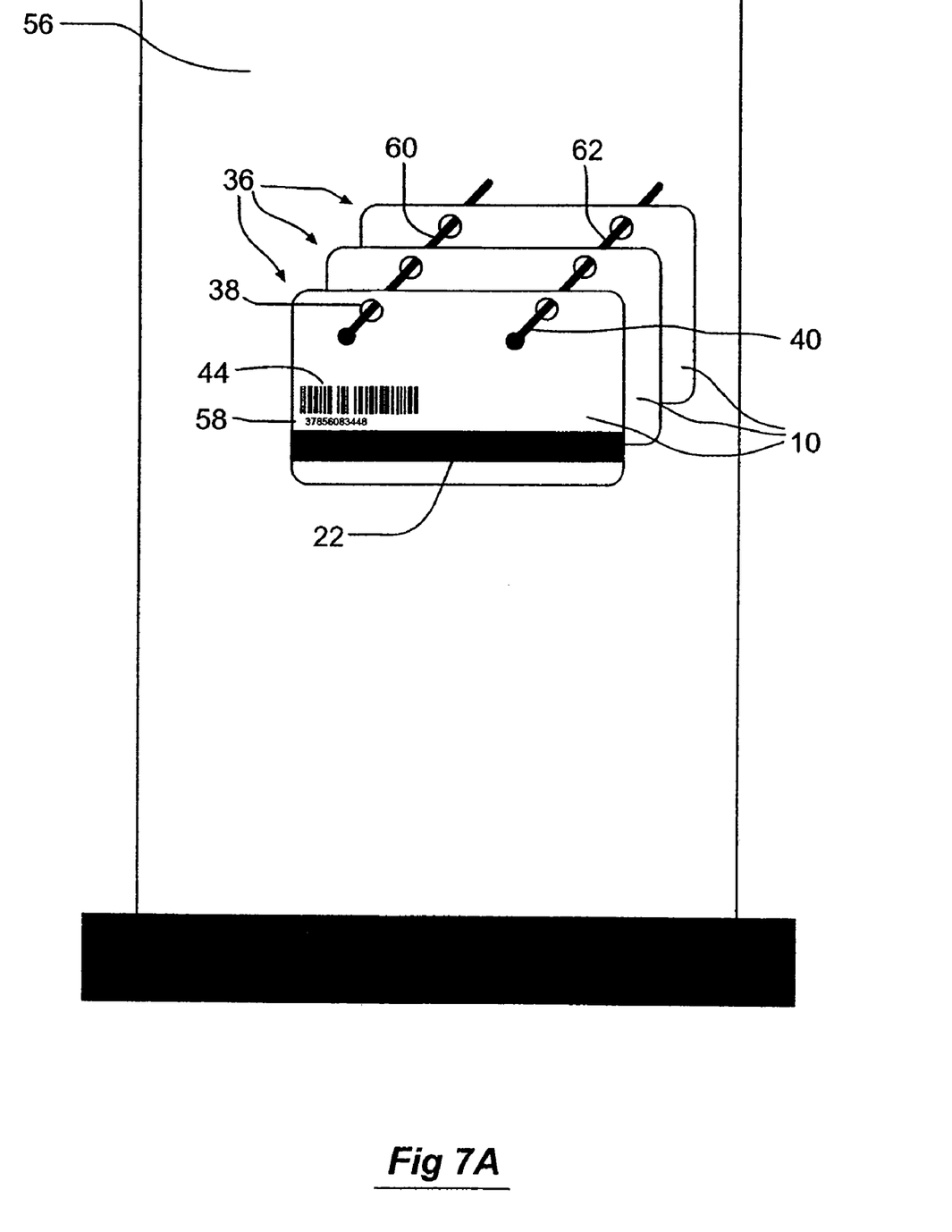
FIGS. 7A and 7B illustrate methods for displaying a financial presentation instrument in accordance with the present invention.
Figure 7B:
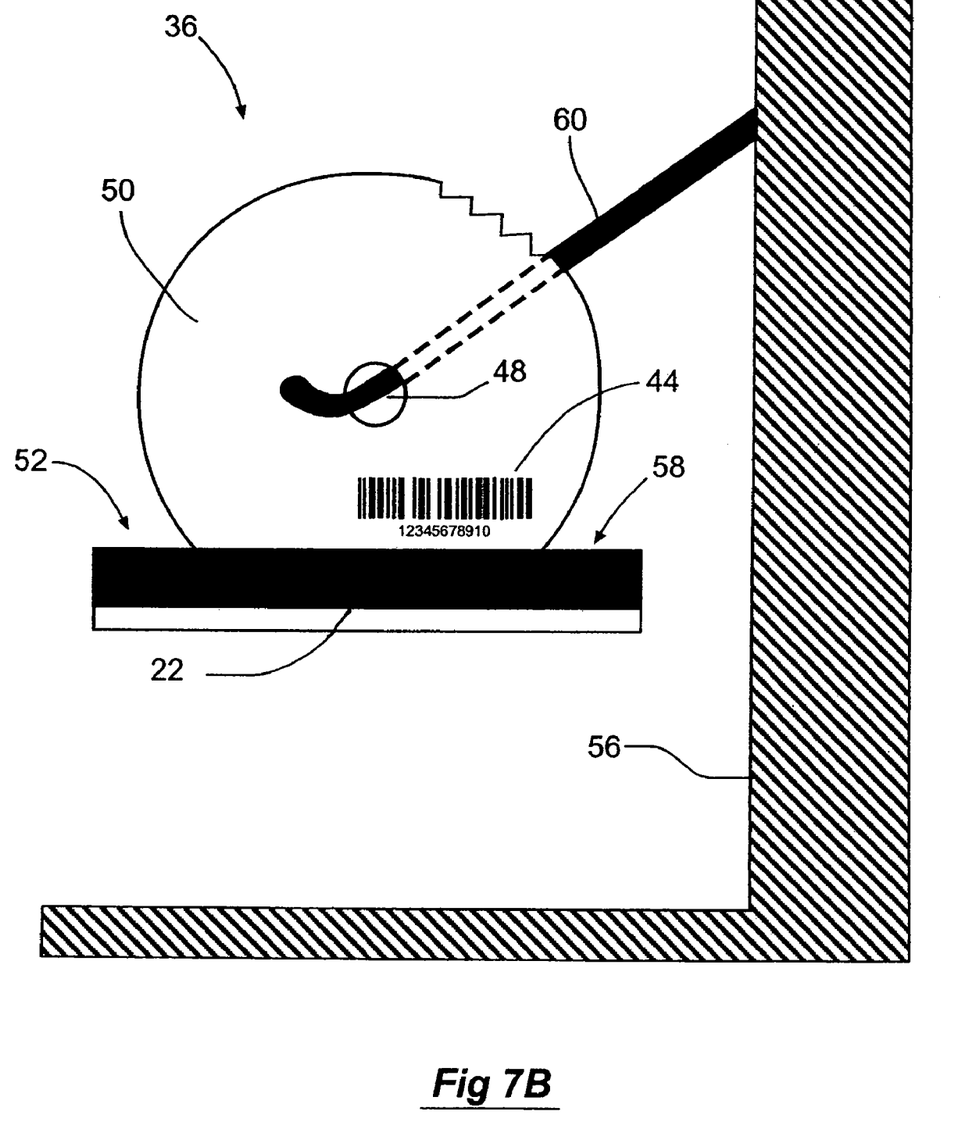

FIGS. 7A and 7B illustrate methods for displaying a financial presentation instrument 36 with an integrated holder in accordance with the present invention. FIG. 7A shows a method of displaying the financial presentation instrument of FIG. 2A in a store display 56. The method comprises providing a data card 10 having an information storage medium and a pair of apertures 38, 40 therethrough. The storage medium comprises a magnetic stripe 22 or bar code 44 that stores a card number 58. A pair of display hooks 60, 62 are also provided. The data card 10 is then suspended from the display hooks 60, 62 through the pair of apertures 38, 40. FIG. 7B shows a method of displaying the financial presentation instrument of FIG. 5 in a store display 56. The method comprises providing a circular shaped data card 50 having an information storage medium located on one flat bottom edge of the data card 50 and at one centrally spaced aperture 48 therethrough. A display hook 60 is provided. The data card 50 is then suspended from the display hook 60 through the central aperture 48. The display hook(s) will generally comprise J-peg holders that are mounted on a wall or a countertop display. The display hook may alternatively comprise display racks or other suspension systems.

Figure 8:
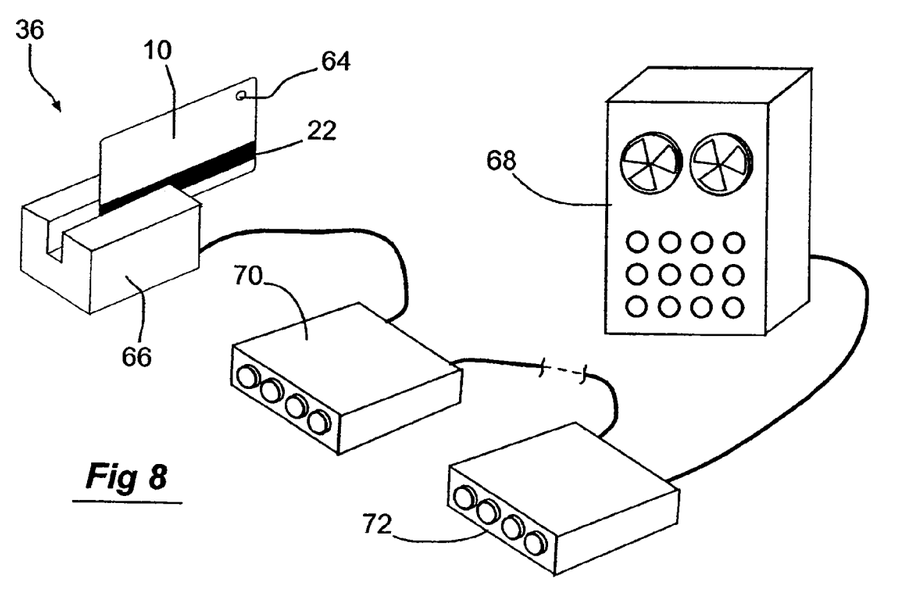
FIG. 8 illustrates activation of a financial presentation instrument of the present invention.

Referring now to FIG. 8, activation of a financial presentation instrument 36 having a rectangular shaped data card 10 with a magnetic stripe 22 and a circular aperture 64 through a top portion 12 of the data card 10 is illustrated. Generally, after the financial presentation instrument with an integrated holder 36 is displayed, it will be activated by a merchant at the time of card purchase by a consumer. The instrument 36 may be activated to any desired amount a consumer wishes to attribute to the debit card. For example, the data cards may be activated to a denomination of $5, $10, $15, $20, $50, $100, or any other desired denomination. In particular, the magnetic stripe 22 will be swiped through a conventional magnetic stripe reader 66 so that the debit account may be properly accessed and activated. Typically, an off-site host computer 68 maintains access, activation, and/or debiting processes associated with the instrument 36. As such, a series of modems 70, 72 are often utilized for transmission purposes between the in-store stripe reader 66 and the off-site host computer 68. It will appreciated that any method of data transmission (i.e., other than telephone lines) to link the card reader 66 and host computer 68 could be used.

Figure 9:
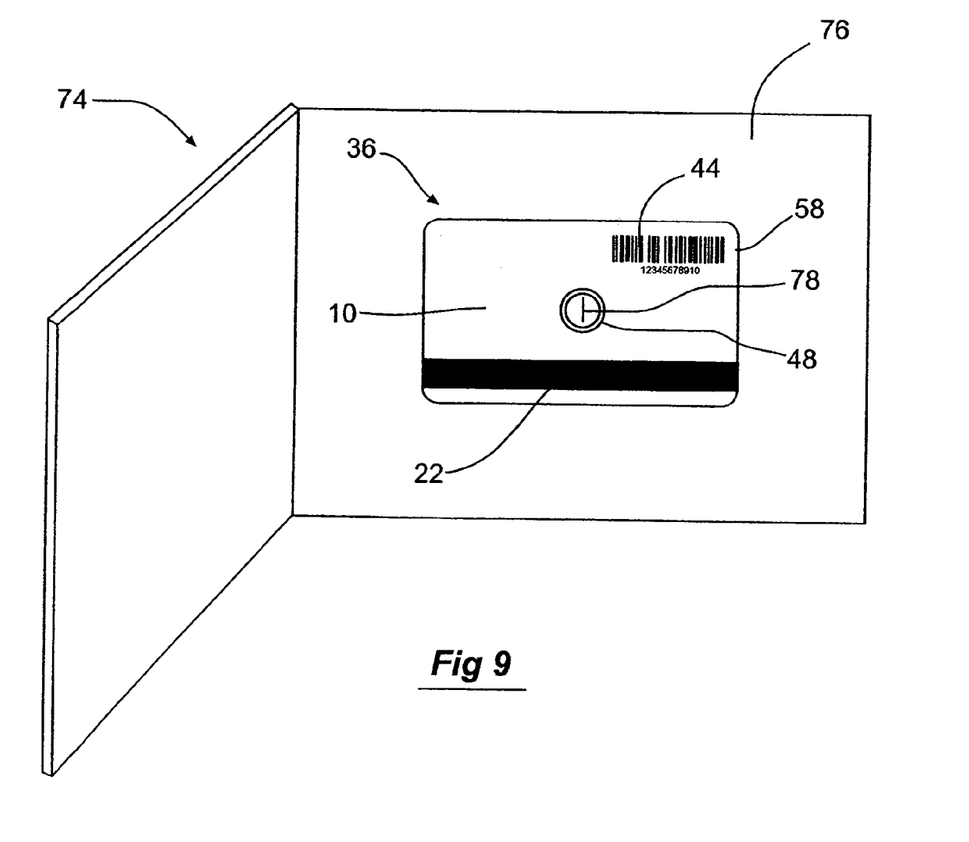
FIG. 9 illustrates a system for packaging a financial presentation instrument in accordance with the present invention.

FIG. 9 illustrates a system 74 for packaging a financial presentation instrument 36 in accordance with the present invention. The system comprises a data card as described above with reference to FIG. 4B. A card carrier 76 having at least one post 78 thereon is also included. The at least one centrally spaced aperture 48 is insertable onto that at least one post 78 so that the data card 10 is securely retained and completely encased by the card carrier 76. The card carrier 76 may comprise a conventional compact disc or DVD holder, as illustrated. Alternatively, the card carrier may simply comprise a folded paper card, box, or any other structure capable of providing a post and completely packaging the data card 10. Further, the card carrier 76 may contain fields for the sender's name, the recipient's name, and/or for a personal message. The at least one post 78 will preferably comprise a centrally spaced raised button such as those found in standard compact disc or DVD cases. In such an instance, the post diameter will be approximately ⅝ of an inch. The aperture 48 correspondingly comprises a centrally spaced circular shape that has a diameter of approximately ⅝ of an inch.

Figure 10A:
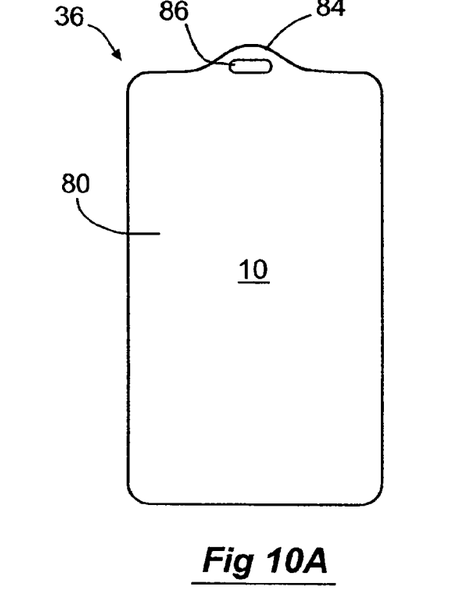
FIGS. 10A-10L illustrate front and back views of a financial presentation instrument in accordance with yet another embodiment of the present invention.
Figure 10B:
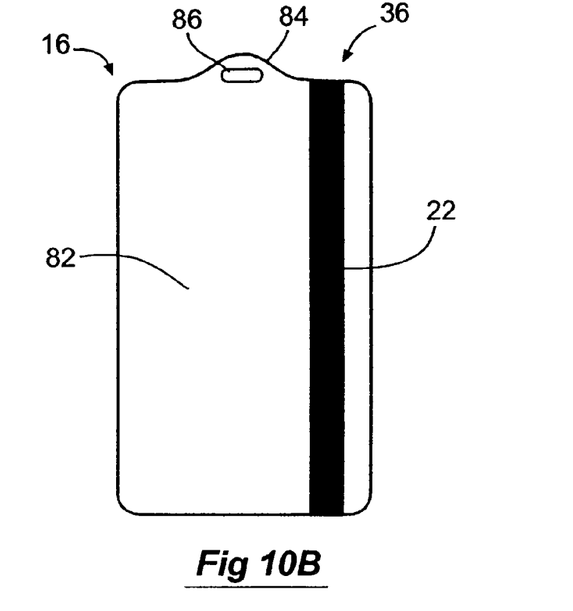
Figure 10C:
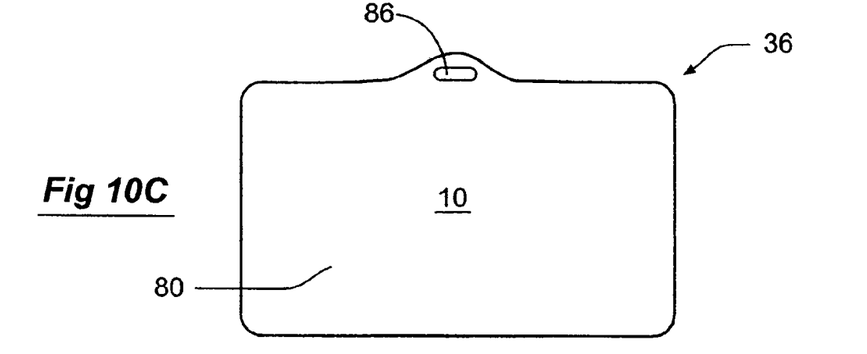
Figure 10D:
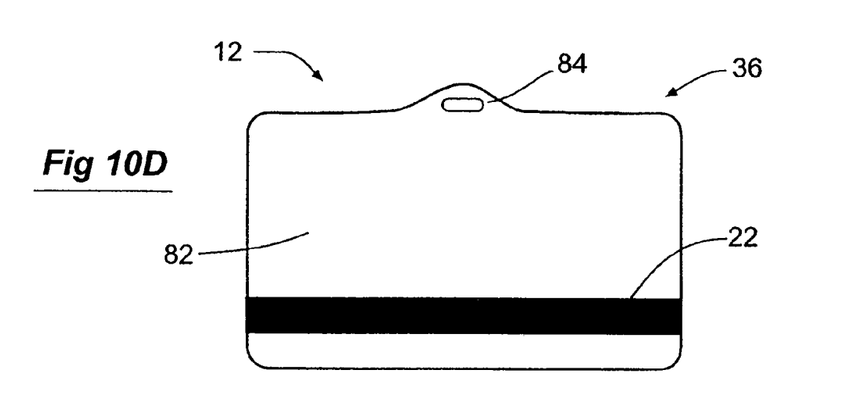
Figure 10E:
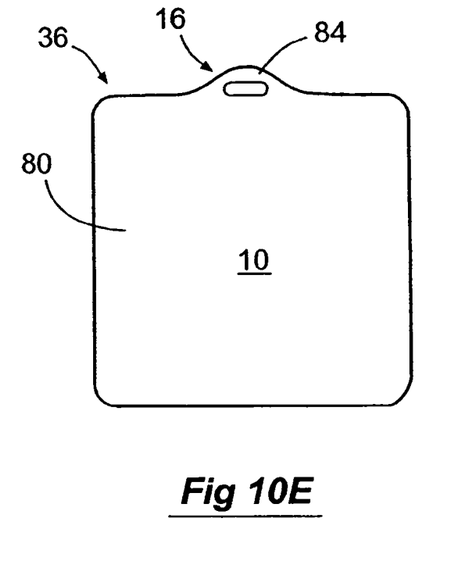
Figure 10F:
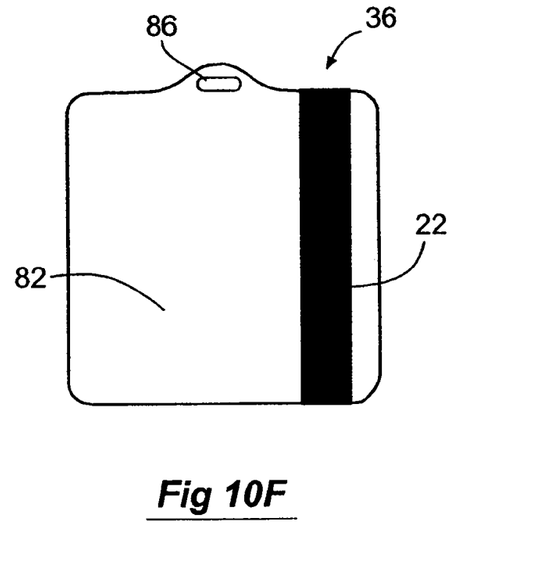
Figure 10G:
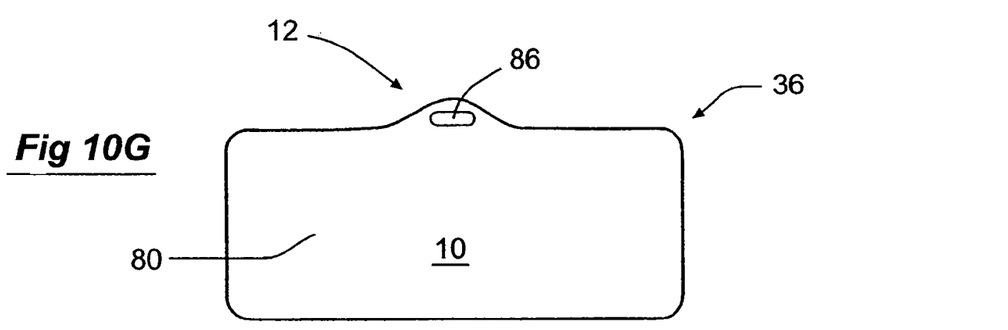
Figure 10H:
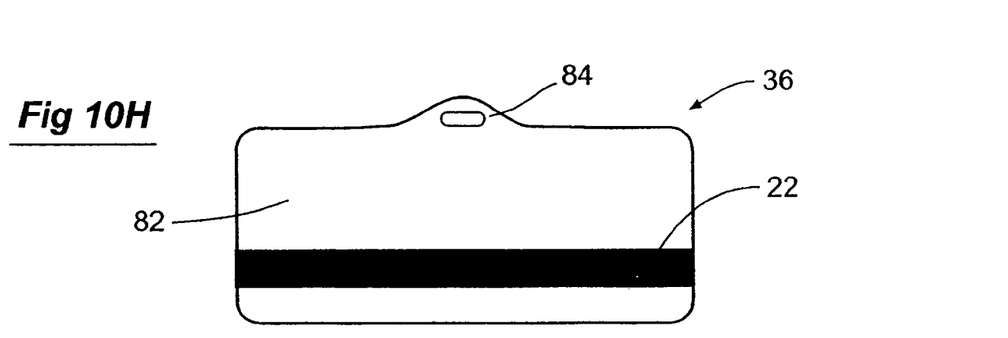
Figure 10I:
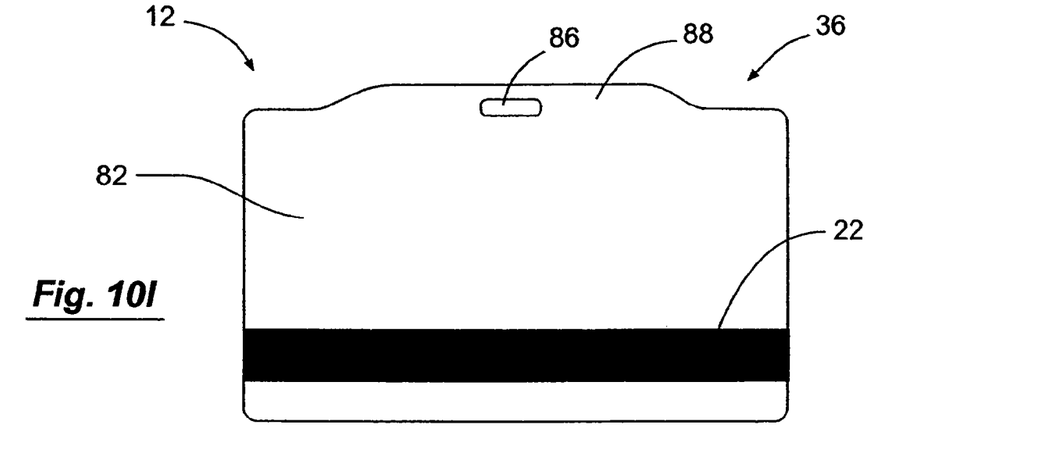
Figure 10J:
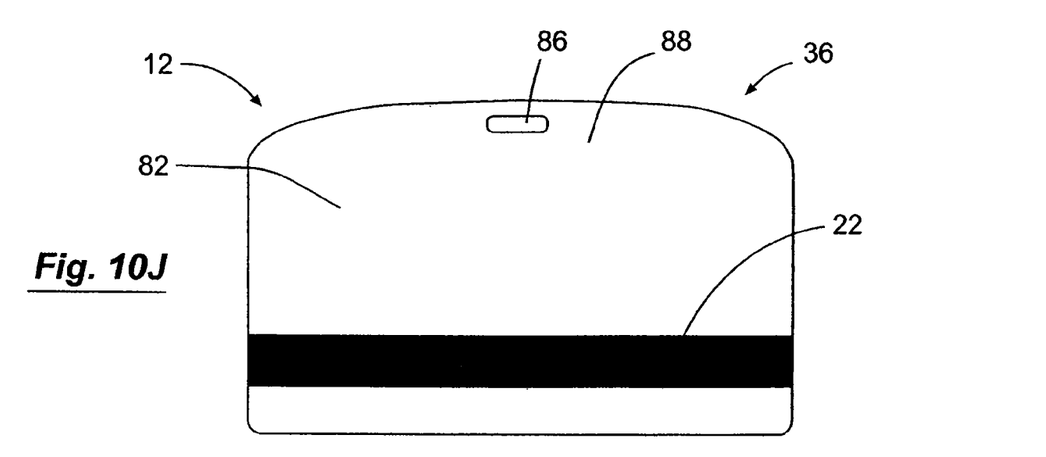
Figure 10K:
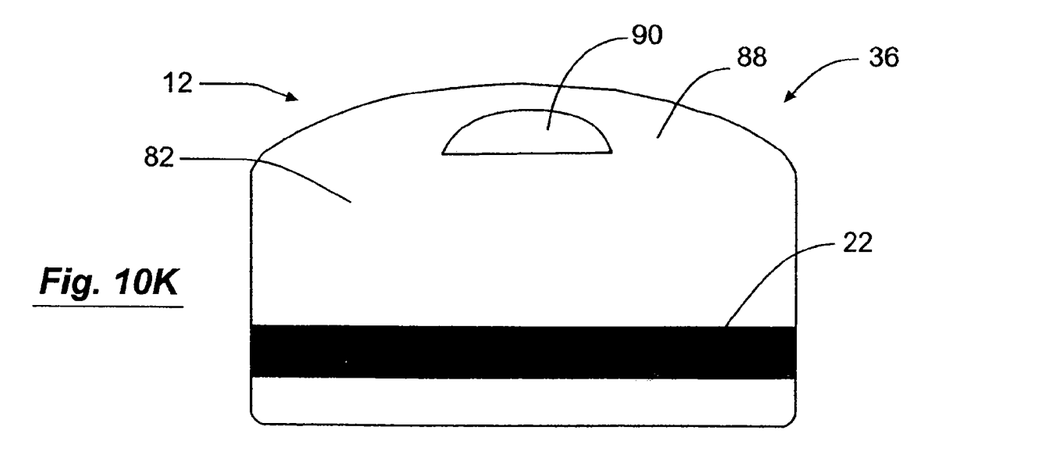
Figure 10L:
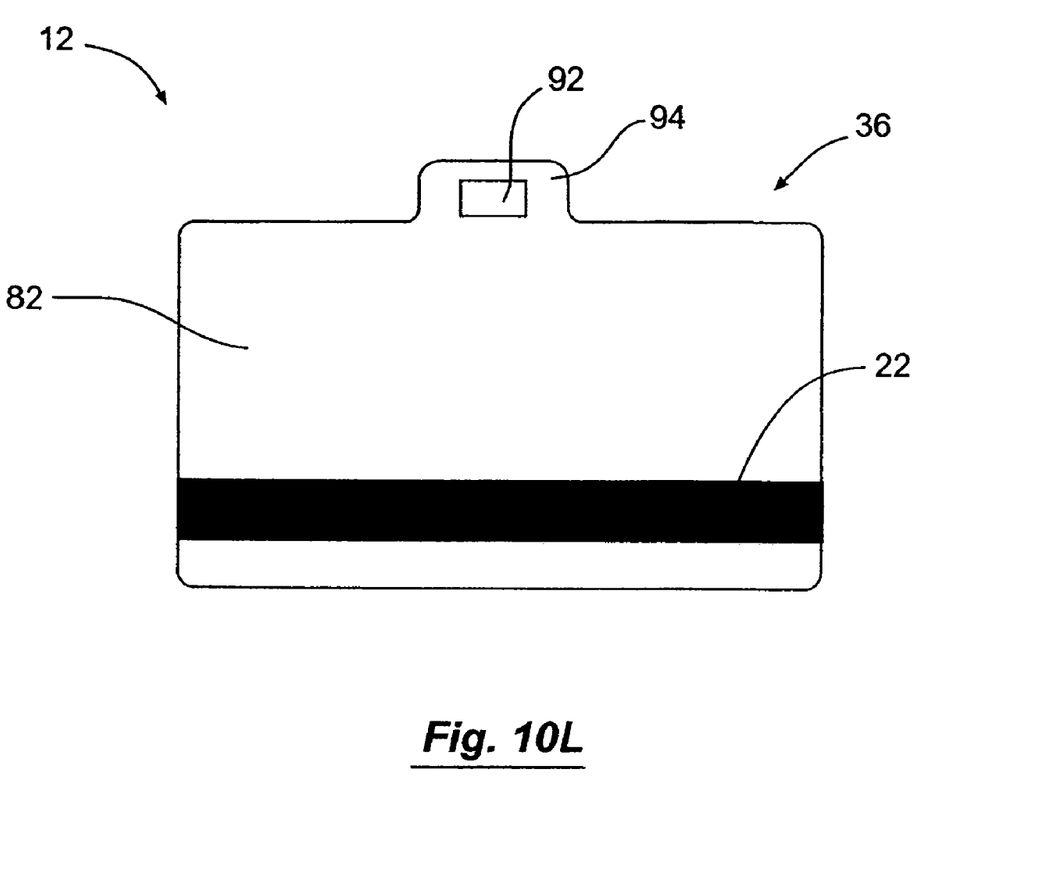

Referring now to FIGS. 10A through 10L, financial presentation instruments 36 with integrated holders in accordance with yet another embodiment of the present invention are illustrated. FIGS. 10A and 10B, illustrate front 80 and back 82 views, respectively, of a financial presentation instrument 36 comprising a data card 10 having a rectangular shape with generally standard credit card dimensions as noted above. In particular, the data card 10 has at least one protrusion 84 and at least one aperture 86, in this case an oval shaped hole, through the protrusion 84 for suspending the data card 10 from a display hook. The at least one protrusion 84 may comprise an integrated tab portion that extends form a side portion 16 of the data card 10. As illustrated in FIGS. 10C and 10D, the at least on protrusion 84 and aperture 86 may alternatively be located on a top portion 12 of the data card 10. FIGS. 10E and 10F illustrate that the data card 10 dimensions may be varied. In this case, the "trim-line" card 10 has a reduced length, typically less than about 3 ⅜ inches. In FIGS. 10G and 10H, the rectangular card 10 has a reduced height, typically less than about 2 ⅛ inches. In FIGS. 10I and 10J, the at least one protrusion comprises an elongated tab 88. In FIG. 10K, the aperture comprises a semi-circular shaped aperture 90 through the elongated protrusion 88. In FIG. 10L, the at least one protrusion comprises a purse or briefcase handle 94 having a square shaped aperture 92 therethrough. In still further embodiments, the data card 10 may further comprise a second protrusion with an additional aperture therethrough.

It will be appreciated that the data card may comprise a variety of shapes and sizes depending on how the data card is to be displayed and/or packaged and as such is not limited to conventional standard size credit cards. The data card may comprise any desired shape or size that is capable of providing a magnetic stripe and an aperture therethrough for suspension upon a display hook. The data card may comprise any rectangular, circular, semi-circular, oval, rectangle, square or polygonal shape. In some instances, the design of the card may be indicative of a merchants business. For example, the shape of the data card may be in the form of a store front, shoes, athletic equipment (i.e., football, baseball, tennis racket), food products (i.e., pizza, donuts), beverage products, cars, animals, cartoon characters, consumers goods, etc.

Although certain preferred embodiments and methods have been disclosed herein, it will be apparent from the foregoing disclosure to those skilled in the art that variations, modifications, alternative constructions, and equivalents of such embodiments and methods may be made without departing from the true spirit and scope of the invention. Therefore, the above description should not be taken as limiting the scope of the invention which is defined by the appended claims.

What is claimed is:

1. A financial presentation instrument with an integrated holder, the financial presentation instrument comprising:
   a bottom flat edge defining a maximum width of the financial presentation instrument;
   a top edge comprising two flat portions on either side of a protrusion portion, wherein the protrusion portion has a maximum protrusion width along an axis parallel to the bottom flat edge of the financial presentation instrument, the maximum protrusion width being smaller than the maximum width of the financial presentation instrument;
   at least one aperture through the protrusion portion; and
   an information storage medium configured to store a unique identifier.

2. The financial presentation instrument of claim 1, further comprising:
   a front side and a back side; and
   a first side flat portion and second side flat portion, wherein the bottom edge is flat and the financial presentation instrument comprises a data card of rectangular shape.

3. The financial presentation instrument of claim 2, wherein the data card of rectangular shape has dimensions that are about 2 ⅛ inches by about 3 ⅜ inches.

4. The financial presentation instrument of claim 2, wherein the protrusion portion is semi-circular in shape.

5. The financial presentation instrument of claim 2, wherein the protrusion portion is an integrated, non-removable portion of the data card.

6. The financial presentation instrument of claim 1, further comprising:
   two or more additional apertures through the financial presentation instrument, the two or more apertures substantially equidistant from the top edge.

7. The financial presentation instrument of claim 1, wherein the at least one aperture comprises a circular, J-peg, semi-circular, oval, rectangle, square, polygonal, or a combination thereof shape.

8. The financial presentation instrument of claim 1, wherein the financial presentation instrument comprises a gift card or other stored value card.

9. The financial presentation instrument of claim 1, wherein the information storage medium comprises a magnetic stripe, a bar code, radio frequency identification, a computer chip, an electronic storage medium, or any combination thereof.

10. The financial presentation instrument of claim 1, wherein the aperture is centrally spaced with respect to the protrusion portion.

11. The financial presentation instrument of claim 1, wherein the two flat portions comprise:
    a first flat portion and a second flat portion, wherein the first flat portion has a first width and the second flat portion has a second width; and
    the sum of the first width, the second width, and the maximum protrusion width is at most the maximum width of the financial presentation instrument.

12. A financial presentation instrument with an integrated holder comprising a data card, the data card comprising:
    a front side, wherein the front side comprises a live copy limit;
    a back side, wherein the back side comprises an information storage medium configured to store a unique identifier;
    a first side flat portion and a second side flat portion, wherein the first side flat portion and the second side flat portion are each about 2 ⅛ inches;
    a flat bottom edge, wherein the flat bottom edge is about 3 ⅜ inches;
    a curved top edge extending from a top of the first and second side portions to form a protrusion portion; and
    at least one aperture through the protrusion portion.

* * * * *

UNITED STATES PATENT AND TRADEMARK OFFICE
CERTIFICATE OF CORRECTION

| | |
|---|---|
| PATENT NO. | : 7,559,479 B2 |
| APPLICATION NO. | : 11/849766 |
| DATED | : July 14, 2009 |
| INVENTOR(S) | : McGee et al. |

It is certified that error appears in the above-identified patent and that said Letters Patent is hereby corrected as shown below:

Column 8, line 22, delete "101", and insert --10I--;

Signed and Sealed this

Thirteenth Day of October, 2009

David J. Kappos
*Director of the United States Patent and Trademark Office*